United States Patent
Teo et al.

(10) Patent No.: US 10,089,636 B2
(45) Date of Patent: Oct. 2, 2018

(54) SYSTEM FOR COLLECTING CUSTOMER FEEDBACK IN REAL-TIME

(75) Inventors: Choon Hui Teo, Sunnyvale, CA (US); Su-Lin Wu, San Carlos, CA (US)

(73) Assignee: EXCALIBUR IP, LLC, Sunnyvale, CA (US)

( * ) Notice: Subject to any disclaimer, the term of this patent is extended or adjusted under 35 U.S.C. 154(b) by 402 days.

(21) Appl. No.: 13/316,475

(22) Filed: Jan. 20, 2012

(65) Prior Publication Data

US 2013/0191180 A1 Jul. 25, 2013

(51) Int. Cl.
G06Q 10/00 (2012.01)
G06Q 30/02 (2012.01)

(52) U.S. Cl.
CPC ......... *G06Q 30/02* (2013.01); *G06Q 30/0203* (2013.01); *G06Q 30/0225* (2013.01)

(58) Field of Classification Search
None
See application file for complete search history.

(56) References Cited

U.S. PATENT DOCUMENTS

| | | | |
|---|---|---|---|
| 5,978,773 A * | 11/1999 | Hudetz et al. | 705/23 |
| 6,064,979 A * | 5/2000 | Perkowski | 705/26.62 |
| 7,398,223 B2 * | 7/2008 | Kahlert et al. | 705/7.32 |
| 2005/0182695 A1 * | 8/2005 | Lubow et al. | 705/28 |
| 2005/0203854 A1 * | 9/2005 | Das et al. | 705/64 |
| 2006/0143066 A1 * | 6/2006 | Calabria | G06F 17/30867 |
| | | | 705/7.29 |
| 2006/0169772 A1 * | 8/2006 | Page | G06Q 30/02 |
| | | | 235/383 |
| 2009/0112683 A1 * | 4/2009 | Hamilton et al. | 705/10 |
| 2009/0313089 A1 * | 12/2009 | Bonner et al. | 705/10 |
| 2011/0106721 A1 * | 5/2011 | Nickerson et al. | 705/347 |
| 2011/0238516 A1 * | 9/2011 | McAfee | G06Q 30/0185 |
| | | | 705/26.1 |
| 2012/0036015 A1 * | 2/2012 | Sheikh | G06Q 30/02 |
| | | | 705/14.54 |

OTHER PUBLICATIONS

Dawn G., Gregg and Scott Judy E. "The Role of Reputation Systems in Reducing On-Line Auction Fraud." International Journal of Electronic Commerce, No. 3, 2006, p. 95. EBSCOhost. (Year: 2006).*

Weija You, Lu Liu, Mu Xia, Chenggong LV. Reputation inflation detection in a Chinese C2C market. Electronic Commerce Research and Applications, 2011, www.elsevier.com. (Year: 2011).*

* cited by examiner

*Primary Examiner* — Stephanie Z Delich
(74) *Attorney, Agent, or Firm* — Cooper Legal Group, LLC

(57) ABSTRACT

Real-time consumer feedback collection includes: receiving a unique product code from a device associated with a consumer of a product, the unique product code, when decoded, revealing an address of an on-line survey site; providing an interface within the on-line survey site for providing feedback about the product; receiving the feedback; storing the feedback; and supplying the feedback to the producer of the product.

20 Claims, 7 Drawing Sheets

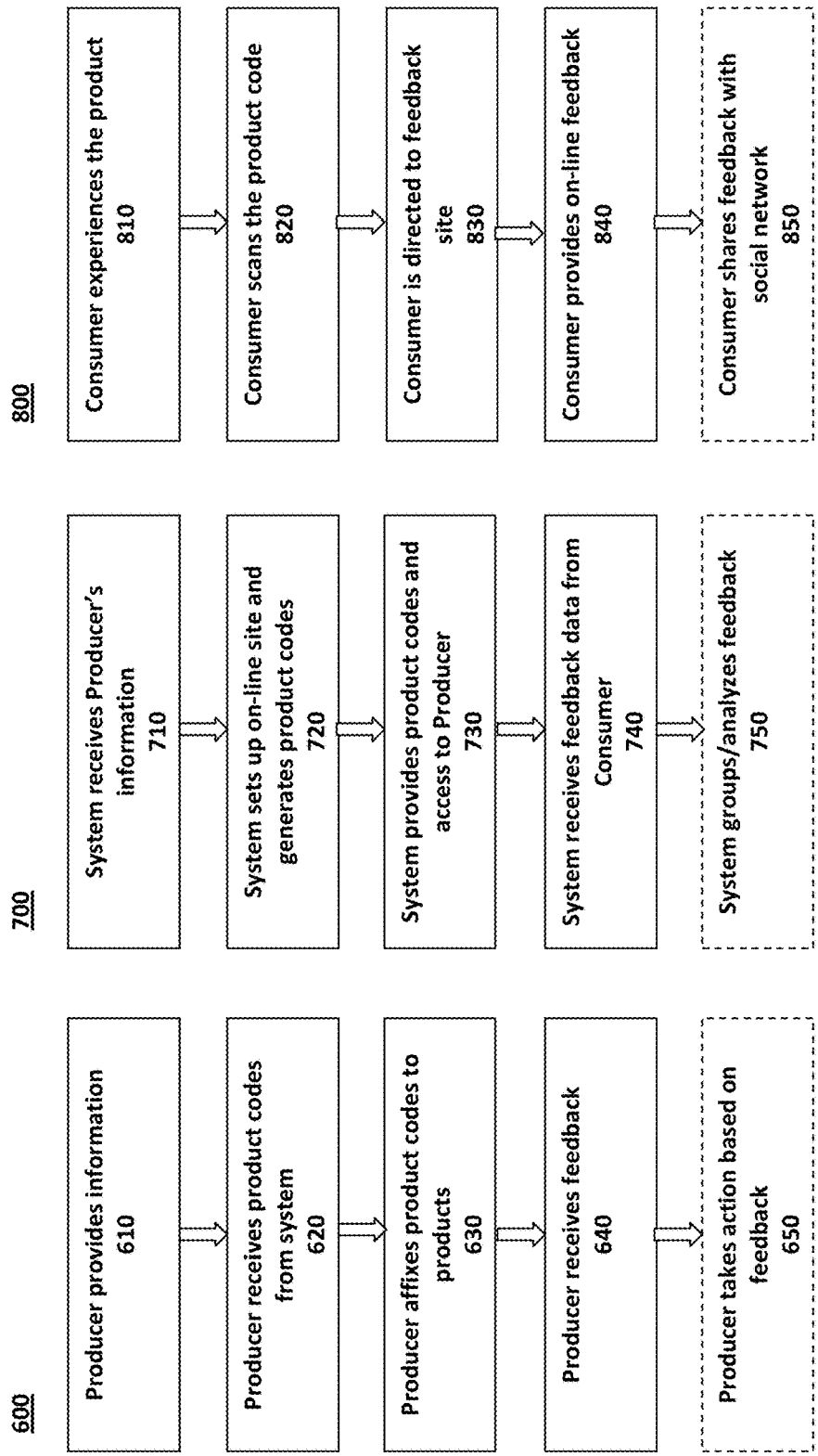

SYSTEM FOR COLLECTING CUSTOMER FEEDBACK IN REAL-TIME

CROSS-REFERENCE TO RELATED APPLICATIONS

None.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The invention disclosed broadly relates to the field of marketing research, and more particularly relates to the field of using mobile or other connected devices to provided real time customer feedback.

BACKGROUND OF THE INVENTION

Businesses remain viable by attracting new customers and retaining existing customers. Business owners must know what attracts and retains customers. In order to determine what customers like or do not like about the products (goods or services) offered by the business ("the producer") and whether or not a customer ("consumer") is likely to recommend the products, business owners are constantly seeking feedback from customers. Conventionally, business owners collect feedback from customers by asking customers to fill out survey forms or to answer survey phone calls. Unfortunately, customers find these approaches to be cumbersome and time-consuming; hence survey participation rates are generally low. To the business owners, these approaches are costly, as they may require marketing researchers to carry out the survey and to analyze the survey outcome in order to draw meaningful conclusions from the customers' feedback.

Therefore, there is a need for a method and system to improve the collection of customer feedback in order to overcome the shortcomings of the known art.

SUMMARY OF THE INVENTION

Briefly, according to an embodiment of the invention, a method for providing real-time consumer feedback collection includes steps or acts of: receiving a unique product code from a device associated with a consumer of a product, the unique product code, when decoded, revealing an address of an on-line survey site; providing an interface within the on-line survey site for providing feedback about the product; receiving the feedback; storing the feedback; and supplying the feedback to the producer of the product.

According to another embodiment of the present invention, a system for providing real-time consumer feedback collections includes: a memory with instructions stored therein. The instructions enabling a computer to perform: receiving a unique product code from a device associated with a consumer of a product, the unique product code, when decoded, revealing an address of an on-line survey site; providing an interface within the on-line survey site for providing feedback about the product; receiving the feedback; storing the feedback; and supplying the feedback to the producer of the product. The system further includes the processor device for executing the instructions.

According to another embodiment of the present invention, the method steps are provided in a computer-readable storage medium such as a DVD-ROM.

The method can also be implemented as machine executable instructions executed by a programmable information processing system or as hard coded logic in a specialized computing apparatus such as an application-specific integrated circuit (ASIC).

BRIEF DESCRIPTION OF THE SEVERAL VIEWS OF THE DRAWINGS

To describe the foregoing and other exemplary purposes, aspects, and advantages, we use the following detailed description of an exemplary embodiment of the invention with reference to the drawings, in which:

FIG. 6 is a flowchart of the feedback collection method from the producer's point of view, according to an embodiment of the invention;

FIG. 7 is a flowchart of the feedback collection method from the system's point of view, according to an embodiment of the invention;

FIG. 8 is a flowchart of the feedback collection method from the consumer's point of view, according to an embodiment of the invention;

Figure 1:
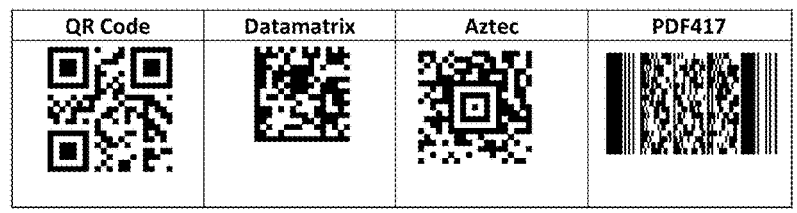
FIG. 1 shows exemplary bar codes, according to the known art.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

Before describing in detail embodiments that are in accordance with the present invention, it should be observed that the embodiments reside primarily in combinations of method steps and system components related to systems and methods for placing computation inside a communication network. Accordingly, the system components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

We describe a real-time customer feedback collection system that allows Producers to create online profiles and survey forms in order to receive feedback on their products and services. Each of the products registered in the customer feedback collection system will be assigned a (linear or matrix) barcode that encodes some information indentifying the product. Consumers who have purchased the products/services can provide their feedback by first scanning the product barcode using a smart phone or other device and then filling out the survey form retrieved from the system.

Some of the advantages of the feedback collection system are:

a) providing knowledge (from acquired data) about the interactions between producers and consumers;

b) providing insight into the preferences of consumers and the interactions between producers, products, and consumers;

c) providing valuable information that can be used in target advertising;

d) providing trending data regarding which products are popular; and e) providing temporal and demographic data about the products and consumers from analysis of the time and place of the feedback;

The customer feedback collection system allows producers to create product surveys and analyze a consumer's feedback in real-time. The on-line feedback survey may be limited to one product or it may consist of a list of products, each assigned a unique identifier encoded in a 2D (linear/matrix) barcode (e.g., UPC, QR code, Data Matrix) generated by the proposed system.

Referring now to the drawings and to FIG. 1 in particular, we show various 2D (two dimensional) barcodes 100 encoding the string "www.yahoo.com," according to the known art. Today there are two types of widely used barcode standards: linear and matrix barcodes (1D and 2D). Of the two types, linear barcodes are the most common, but have low capacity compared to matrix barcodes. Several widely used 2D codes are QR code, Datamatrix, Aztec, and PDF417. These codes are free to use and their specifications are clearly defined. More importantly, their capacity is so high that a few thousands of alphanumeric characters can be encoded in a print area as small as 17 mm$^2$.

The product codes generated by the system according to the invention can be printed out and affixed to the products. If the product is a service, the product codes can be displayed in such a manner that it is evident to which service they are associated. Consumers who wish to provide feedback for these products can use their smart phones equipped with a camera and a pre-installed scanner application (i.e., a component of the proposed system) to scan the barcodes located on the products. The pre-installed application then decodes the scanned barcode and extracts the product identifier for use in retrieving the survey form of the product from the feedback system. Depending on the needs of the producers, their consumers can provide feedback in the form of a numerical rating and/or plain text comments.

To promote survey participation, business owners can introduce incentives such as giving out free gifts to some randomly selected consumers who participate in the survey. In addition, the proposed system, with the consent of the business owners, may allow their customers to share the products they "liked" with their online social networks. This "sharing" option would also allow the business owners to expose their products to potential customers by word-of-mouth. This, in fact, is an additional motivation for the business owners to use the proposed system.

Figure 2:
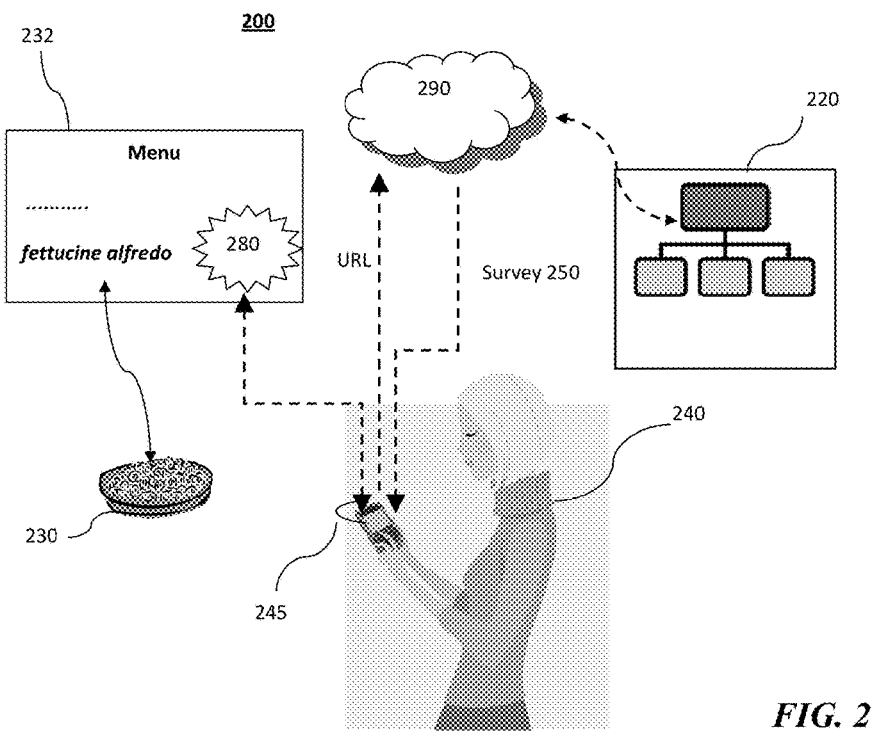
FIG. 2 is an exemplary illustration of product feedback collection, according to an embodiment of the present invention.

The customer feedback collection system allows a business to gain insights about when, where, and why consumers like/dislike their products. FIG. 2 is a simplified illustration of the feedback collection system 220 operating within a restaurant scenario 200. In this example the product 230 is a restaurant meal, "fettucine alfredo." The restaurant diner 240 (the consumer) in this example orders the product from a menu 232. This scenario 200 reflects a use case where the product code cannot be directly affixed to the product because the product is a meal. Instead, the product code 280 is affixed or stamped on the menu 232 and positioned so that it is clear to the consumer 240 that code 280 is associated with the fettucine alfredo. After the meal, the consumer 240 uses a scanner 245 coupled with her mobile device to scan the barcode 280 that is associated with the product 230.

The scanner 245 may be a proprietary feedback application (app) scanner 245 available from feedback collection system 220 or a generic 2D code scanner available on many mobile devices. Together with a camera, the scanner app 245 enables the consumer 240 to scan and decode the product 2D code 280 to extract the information that ultimately provides the consumer with the corresponding product survey form. The scanner 245 decodes the barcode 280 to retrieve the URL (uniform resource locator) of the on-line site where the feedback survey 250 can be found.

Now the consumer 240 accesses the URL and enters the Internet 290 with the URL as the navigation address. The site with the feedback survey 250 associated with the product 230 is then served to the consumer's mobile device to receive the consumer's feedback. In another embodiment, once the product code 280 has been scanned and decoded, the system 220 uses push technology to directly serve the on-line site to the consumer 240 on the mobile device.

Figure 3:
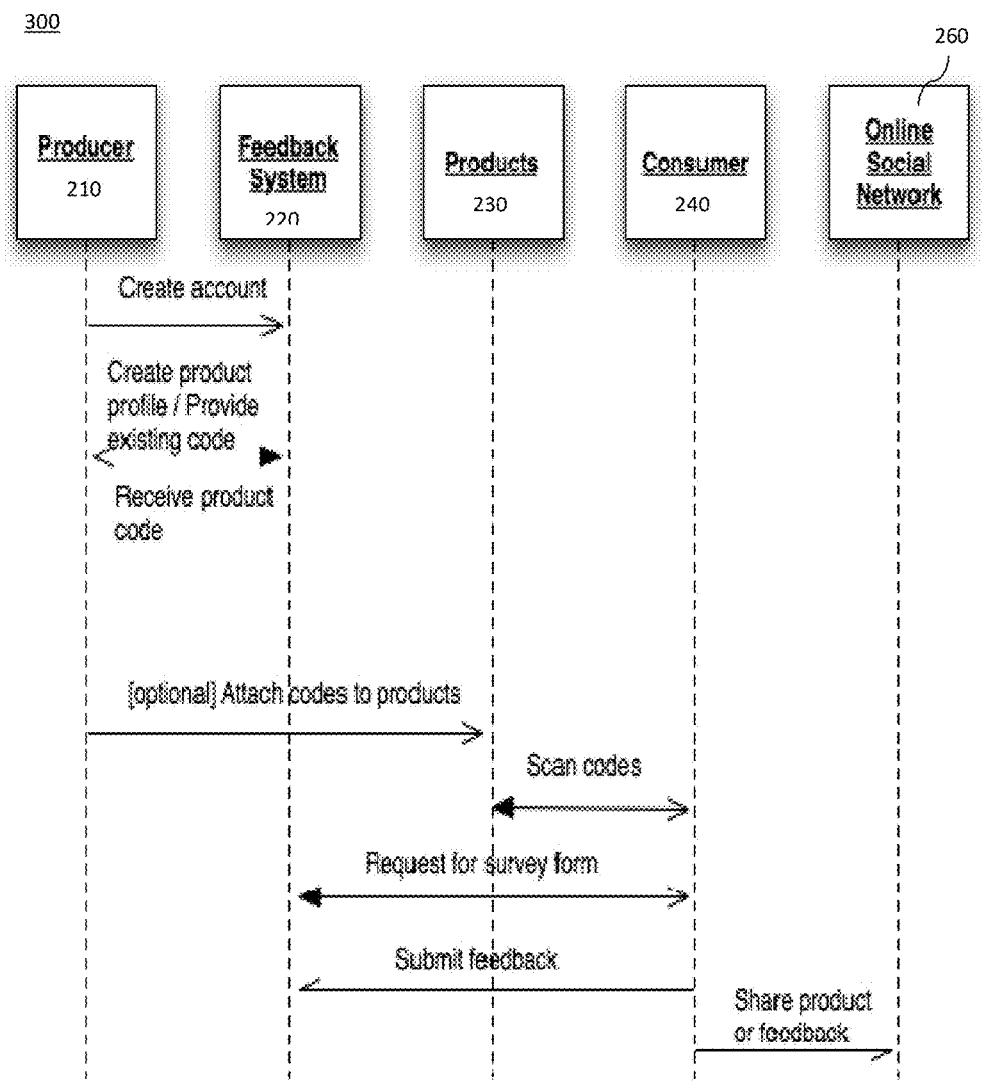
FIG. 3 is an interaction diagram for various parties involved in the feedback process, according to an embodiment of the present invention.

FIG. 3 shows a diagram 300 of the interactions among the proposed feedback collection system 220, producers 210, products 230, and consumers 240. As the diagram 300 shows, the producer 210 creates an account in order to use the feedback system 220. This can be done on-line. The producer 210 next creates a product profile for each product 230 for which the producer 210 wishes to receive feedback. In one embodiment of the present invention, the producer 210 provides the existing bar codes associated with these products to the feedback system 220. The feedback system 220 supplies the producer 210 with new product codes, generated from a combination of the existing bar code, the producer's account ID, and a URL to the feedback site. Alternatively, the producer 210 does not need to supply existing barcodes to the system 220 and the system 220 generates the product codes 280 using the URL, the producer's account ID, and a sequence number.

The producer 210 then must associate each product 230 with its corresponding product code 280 generated by the system 220. This is generally done by printing the codes 280 and affixing them to the products 230. The producer 210 can then confirm that the product codes are correctly associated by running them through the feedback system 220. Once the codes 280 are attached to, or in some way associated with, the products 230, the consumers 240 are able to scan the codes 280 associated with the products 230. By scanning the codes 280, the consumers 240 are able to access a survey form 250. The survey form can be served to the consumer's 240 device when the code is scanned; or in the alternative, the consumer 240 requests a survey form 250 from the system 220 and submits feedback on the product 230 to the system 220. Additionally, the consumer 240 is also able to share product feedback with his/her online social network 260.

Real-Time Consumer Feedback Collection.

The system 300 includes several databases and processes. The consumer database 440 is used to store consumer information such as demographic data and a synthesized profile of the registered consumers. The producer database 410 contains information such as a company profile of the registered producers. Additionally, the producer 210 can provide information that the producer 210 feels shows the company in a good light. For example, a producer 210 may want a consumer 240 to know that it is a certified "green" business or that it has a strong commitment to diversity.

Figure 4:
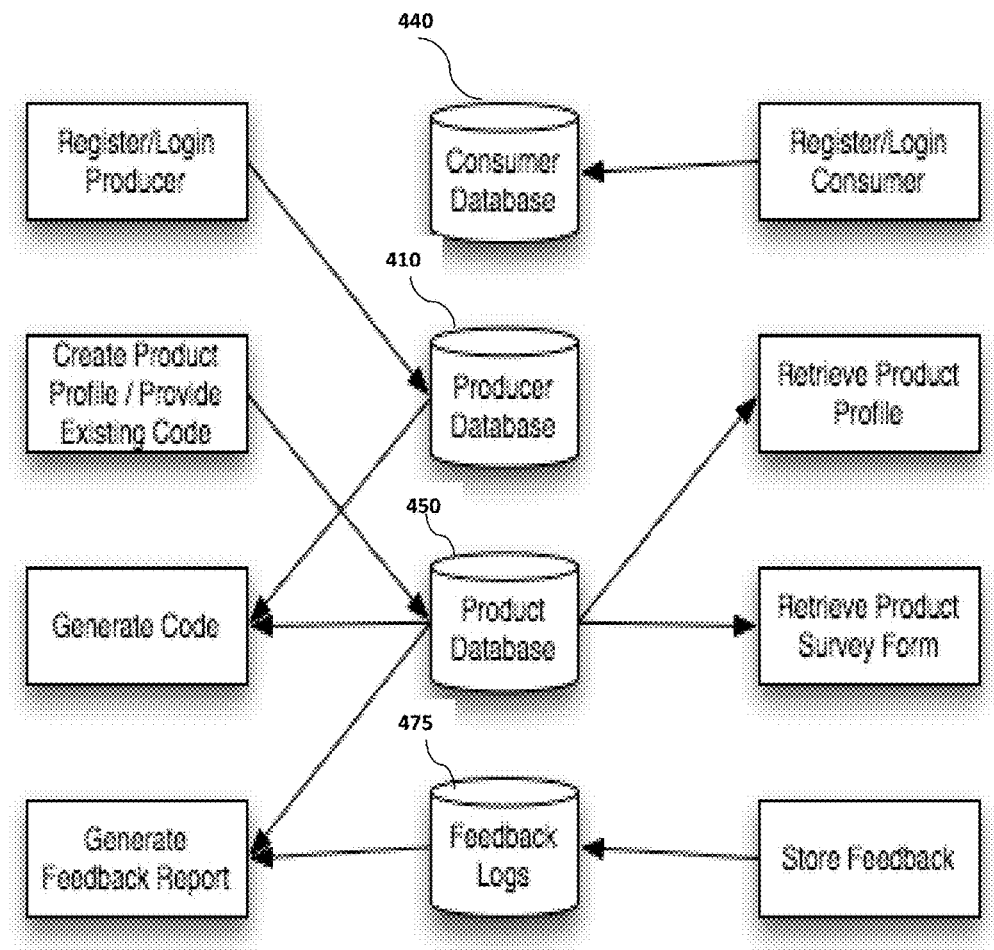
FIG. 4 is a high-level data flow diagram of the databases and processes involved in the feedback collection system, according to an embodiment of the present invention.

The product database 450 contains product specific information in any media format (e.g. text, audio, video) that the producer 210 provides and the corresponding survey data. The feedback database 475 contains the feedback provided by consumers. The information may be stored as logs, charts, queries, or any other format. The key elements of the feedback information that should be retained are: 1) Consumer ID; 2) Product ID; 3) time that the survey form was requested; 4) time that the feedback was submitted; and 5) feedback details. FIG. 4 shows the data flow among the databases and processes in the system 220.

Figure 5:
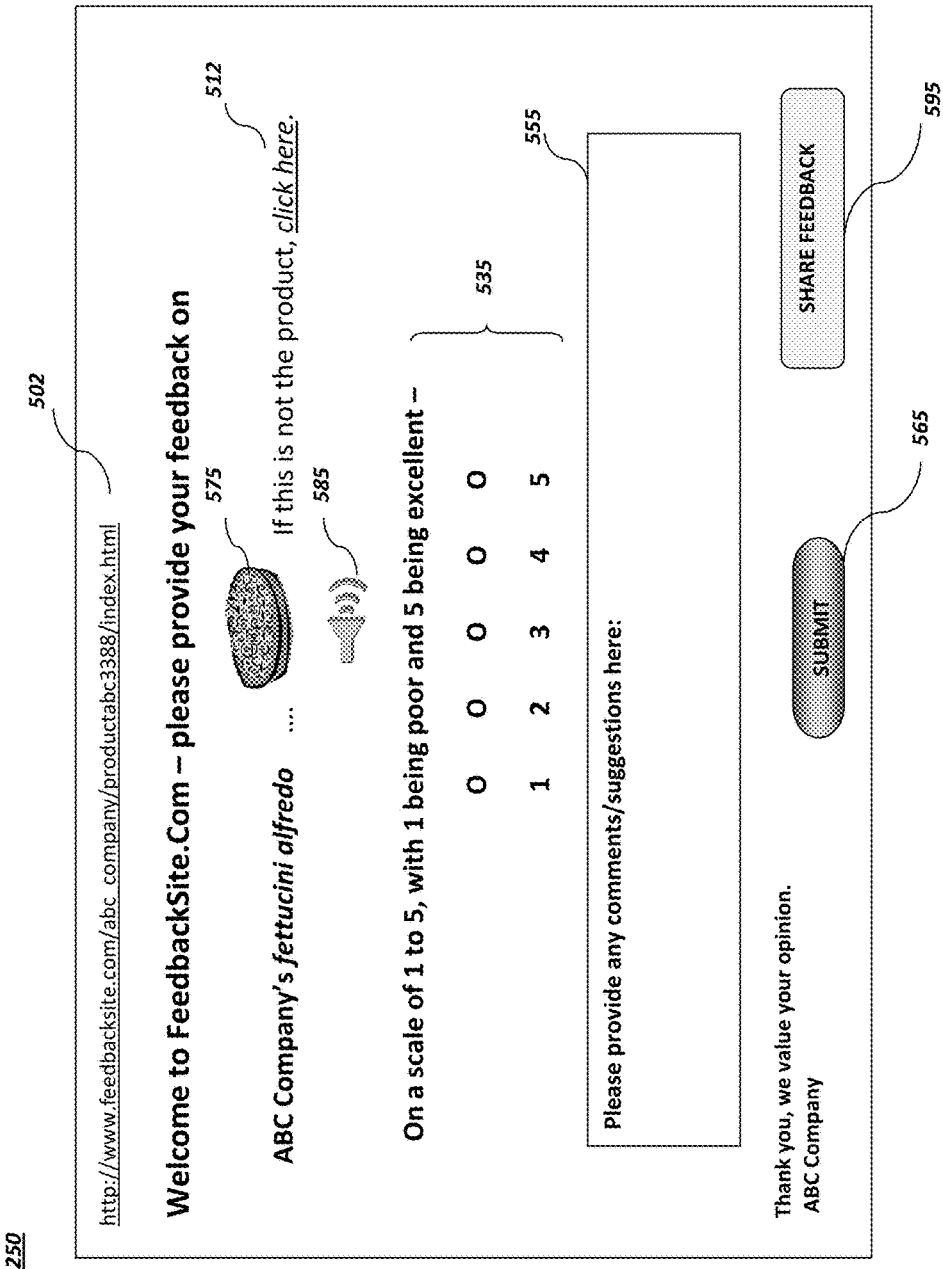
FIG. 5 shows an on-line survey form, according to an embodiment of the present invention.

FIG. 5 shows an exemplary feedback form 250 tied in to the example from FIG. 2. The form 250 is displayed on the consumer's device after scanning the barcode 280. In the alternative, the consumer can be sent the URL 502 of the site. The form 250 can range from very simple to complex. At a minimum, the form 250 should provide: an identification of the product 230 for verification 512; a simple rating system 535 such as selecting from 1 to 5 (poor to excellent); and a submit button 565.

Additionally the form 250 can provide a freeform text box 555 for comments/suggestions and a share button 595 for the consumer 240 to share the product review with his/her social network. Also the form 250 can provide graphical images 575 and video or audio information 585 about the product 230 and/or the producer 210. For example, a restaurant diner 240 may be interested to know that the vegetables are all locally grown and purchased from an organic co-op right in the neighborhood. This may sway the consumer's opinion of the product 230. For example, the meal might not seem overpriced in light of this additional information.

Flowcharts.

FIGS. 6, 7, and 8 are flowcharts of the feedback collection method from the perspective of the producer 210, system 220, and consumer 240, respectively. In FIG. 6 the process 600 begins with the producer 210 providing information to the system 220 in step 610. This information will range from minimal (name of the producer 210 plus a brief description of the products 230) to a full description of the producer 210 and the products 230 with image, video, and audio. Additionally, the producer 210 can provide the barcodes that are already in use with the products 230.

The producer 210 can also select from among templates to structure the feedback form 250. The system 220 provides an interface similar to web design templates that allow users to create their own websites (shown in FIG. 9). The Producer 210 can select a survey template and then customize it with color, images, a logo, and so forth. Survey questions can be input by the producer 210 or standardized questions can be selected. The producer 210 is able to upload company/product images, audio, and/or video to both engage and inform the consumer 240 who will be filling out the survey form 250.

In step 620 the producer 210 receives the product codes 280 generated by the system 220. Receiving the product codes 280 may constitute downloading the codes 280 from the website and printing them. Other means of acquiring the codes 280 from the system 220 are contemplated within the spirit and scope of the invention. If the producer 210 has supplied existing bar codes these will be used to generate the product codes 280, although this is not necessary.

In step 630 the producer 210 must affix the product codes 280 to the product 230. In the case of a restaurant, the product codes 280 can be stamped on the restaurant menu 232. Note that in some cases, such as with services, this can't be done. In those cases, the product code 280 can be stamped or otherwise displayed so that it is clear that the code 280 is associated with the particular service. For example, in a taxi service paradigm, the product code 280 can be stamped on the taxi driver's name plate displayed to the rider.

In step 640 the producer 210 receives the feedback that the consumers 240 input into the system 220. To do this, the producer 210 can log in to the producer's 210 site within the system 220 and see the feedback displayed there. Alternatively, the feedback can be transmitted to the producer 210 as it arrives or on a scheduled basis. The producer 210 will provide for the method to receive feedback when setting up the account. In optional step 650 the producer 210 takes action based on the feedback. For example, the producer 210 may up the lighting if consumers 240 complain that a restaurant is too dark.

FIG. 7 is a flowchart 700 of the process from the system's 220 perspective. In step 710 the system 220 receives the producer's 210 company profile/information and the product information. Additionally, at the time that the producer 210 sets up an account, the producer 210 may indicate a preferred method of receiving the feedback (ad hoc or scheduled) and the producer 210 may also indicate any other preferences, such as how the feedback survey 250 should be structured. Based on this information the system 220 sets up the web site with the survey form 250 and generates the product codes 280 in step 720.

Next in step 730 the system 220 provides the product codes 280 and the login access code to the producer 210. Every registered producer 210 carries a unique producer identifier provided by the feedback system 220. The producer identifier together with a sequence number constitutes a unique product identifier for every product profile created by the producer 210. The URL to a product profile/survey or the product identifier is then encoded in a 2D code 280. The system 220 can generate the code 280 as a combination of the producer identifier and a unique sequence number; or, as stated earlier, the system 220 can take the already existing product bar codes (such as a UPC code) and combine it with a URL. The system 220 may also provide private/public key encryption to assure secure access to the site. Providing the product codes 280 can take the form of making the codes 280 available for download on the site. Once the producer 210 logs in to the site with a validated key, the product codes 280 will be available for download. The producer 210 can print out the codes 280 and affix them to the product 230.

In step 740 the system 220 receives input from the consumer 240 and stores the feedback. In optional step 750 the system 220 is able to analyze the feedback and group the feedback according to parameters such as demographics (location, age, gender of consumer), price, product type, and the like. The system 220 can keep this information over time to provide a temporal history of consumer likes/dislikes for a region, population, and other factors. Feedback data that has been grouped, aggregated, and analyzed can provide more valuable product-specific information than just the raw feedback data.

Referring now to the flowchart 800 of FIG. 8, we track the feedback collection process from the consumer's 240 point of view. In step 810 the consumer 240 experiences the product 230. This can take the form of eating a restaurant meal, riding in a taxi, visiting a museum, getting a haircut, or using a product purchased from a store, among others. In step 820 the consumer 240 uses a barcode app 245 to scan the product code 280 in order to provide feedback on the meal, taxi ride, haircut, museum experience, and so forth. The barcode app 245 can be an application provided by the system 220 or one of the many barcode applications available with many mobile devices today.

In step 830 the consumer's 240 barcode app 245 decodes the product code 280, revealing a URL pointing to the feedback site for that particular product 230. The consumer 240 is then directed to the site to provide feedback. Using his/her mobile device, the consumer 240 provides the feedback in step 840. In most cases, providing the feedback can be completed before the consumer 240 has even left the restaurant, museum salon, etc. In optional step 850 the consumer 240 can Share the feedback with others in the consumer's 240 on-line social network.

Figure 9:
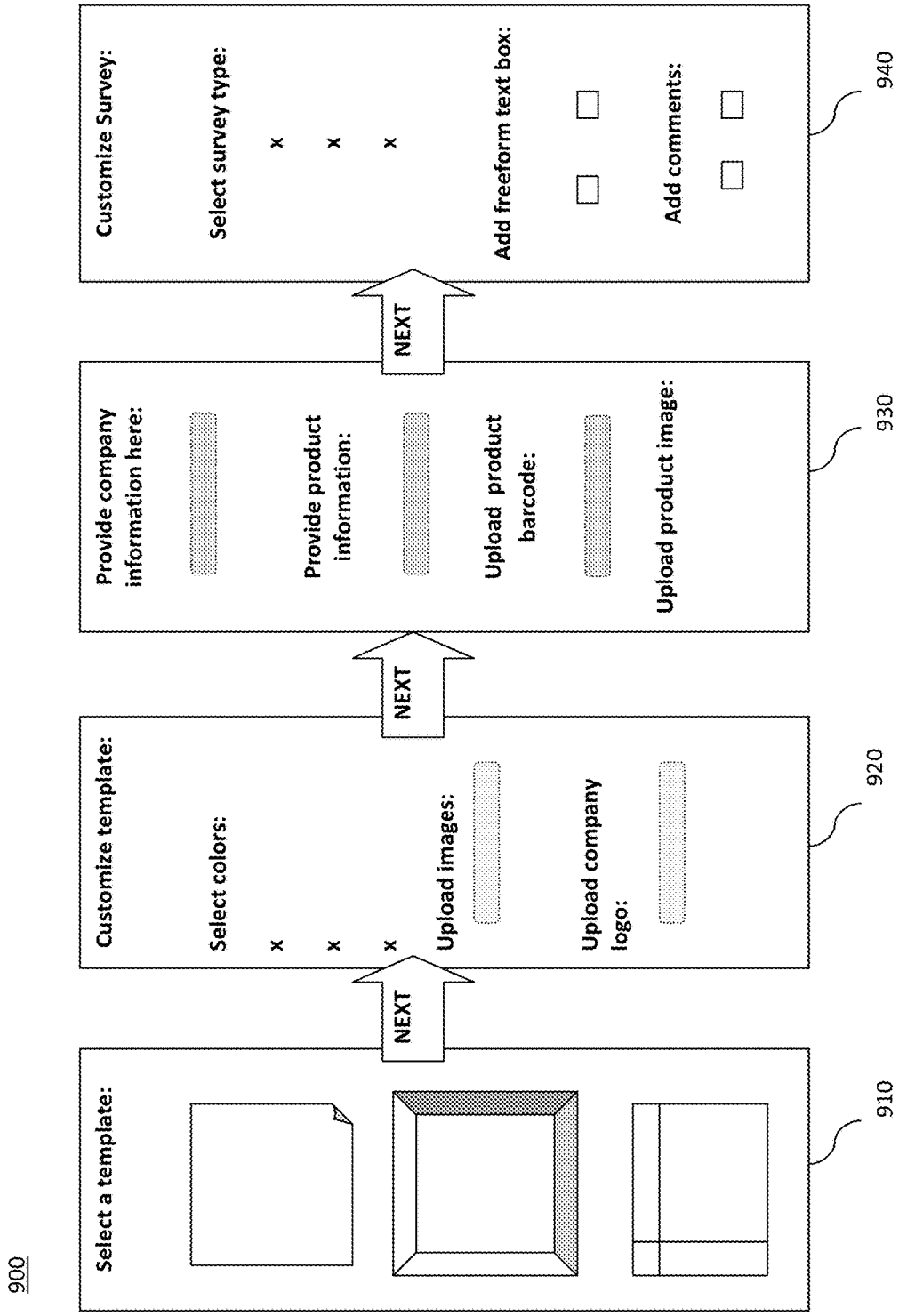
FIG. 9 shows an exemplary interface for generating an on-line survey form, according to an embodiment of the present invention.

FIG. 9 shows an exemplary interface 900 whereby a producer 210 can generate a survey form on-line. In the first screen 910 of the interface the producer 210 can select a template for the survey form 250. In the second screen 920, the producer 210 is able to customize the survey 250. In the next screen 930 the producer 210 provides the company/product information. Here in this screen 930 the producer 210 is also able to upload images/video/audio to enhance the survey. Lastly, the producer 210 customizes the on-line survey form 250 in screen 940.

Abuse Detection and Prevention

Abusers can attack the system 220 from both producer's and consumer's ends. Potential abuses from the producer's end include creation of spam profile pages and 2D codes pointing to some phishing websites. The former case is a typical problem in user-generated content that can be alleviated by actively monitoring the recently created or modified profile pages. The latter case can only be prevented when consumers use our own scanner application that will prohibit any redirection to irrelevant websites.

One potential abuse from the consumer's end is feedback fraud that is likely to be practiced by abusers to manipulate the overall feedback result. For example, an abuser can provide multiple feedback to one particular product. In the case where a product is not physically owned by any consumer, an abuser may keep a photo of the product 2D code and commit the same feedback fraud elsewhere. We discuss here three approaches to alleviate this problem:

1) Restrict the number of feedback entries per product per consumer 240.

2) Ensure that the consumer 240 who has provided feedback is in close proximity to the product 230. This is possible whenever we have the geo-location information of both the product 230 and the consumer 240. Existing geo-location technology readily available on mobile devices makes this fairly easy to accomplish.

3) Change the product code 280 periodically. Producers 210 are allowed to generate different versions of 2D codes for their products 230. Each of these versions carries additional information such as date, time, location, or messages to distinguish itself from the rest of the versions.

4) Furthermore, producers 210 can set an expiry date on these 2D codes 280 so that fraud committed on expired 2D codes 280 can be detected and dealt with.

Additional System Functionality

In addition to collecting feedback, the system also provides the following functionalities to the users:

A) provides general description and a multimedia experience associated with the products such as photos, video, and audio.

B) Interacts with producers and other consumers of the products (in close proximity) in real-time via messaging.

C) Stores and retrieves feedback provided to the system or personal notes about the products.

D) Groups product-specific feedback on products provided by different producers.

Use Cases.

We briefly describe several real-world applications of the proposed feedback system:

Taxi Fleet and Drivers Management

Taxi companies 210 can assign each of their drivers a 2D code 280 so that passengers 240 can provide their feedback about the drivers and/or the vehicles. The barcode 280 can be placed on the plate displaying the driver's name. The feedback system 220 will accumulate feedback and ratings for each driver so that the taxi companies 210 can use the feedback reports 250 as a means of employee appraisal. For example, some survey questions might be: "how clean was the taxi?" "was the driver courteous?"

Restaurants

Restaurant owners 210 can assign 2D codes 280 to their dishes 230 and put them on the menus 232. Their customers 240 can then retrieve comments about the dishes given by their friends or other customers 240. Customers 240 can scan the 2D codes 280 of the dishes 230 they ordered and provide feedback after they have tasted the food. Similarly, customers 240 can give feedback to their servers in the same way.

Exhibitions

Aquariums, zoos, art galleries, and the like exhibit items (e.g., dolphins, tigers, or antique vases) that have great value and history. Exhibitors 210 (i.e. producers) could create profile pages for these items 230 (i.e. products) and allow their patrons 240 (i.e. consumers) to provide feedback or enter into a discussion about the items 230. More importantly, patrons 240 may share these items with their online social network and keep a record of what they have seen and where they have been.

Monetization

The proposed system 220 can be monetized by charging the producers 210 for premium services which may include larger limit on the number of product 2D codes 280, dynamic 2D codes, and more detailed analysis report of consumer feedback. The system 220 can also monetize by displaying advertisements (ads) on the profile pages.

Hardware Embodiment.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Figure 10:
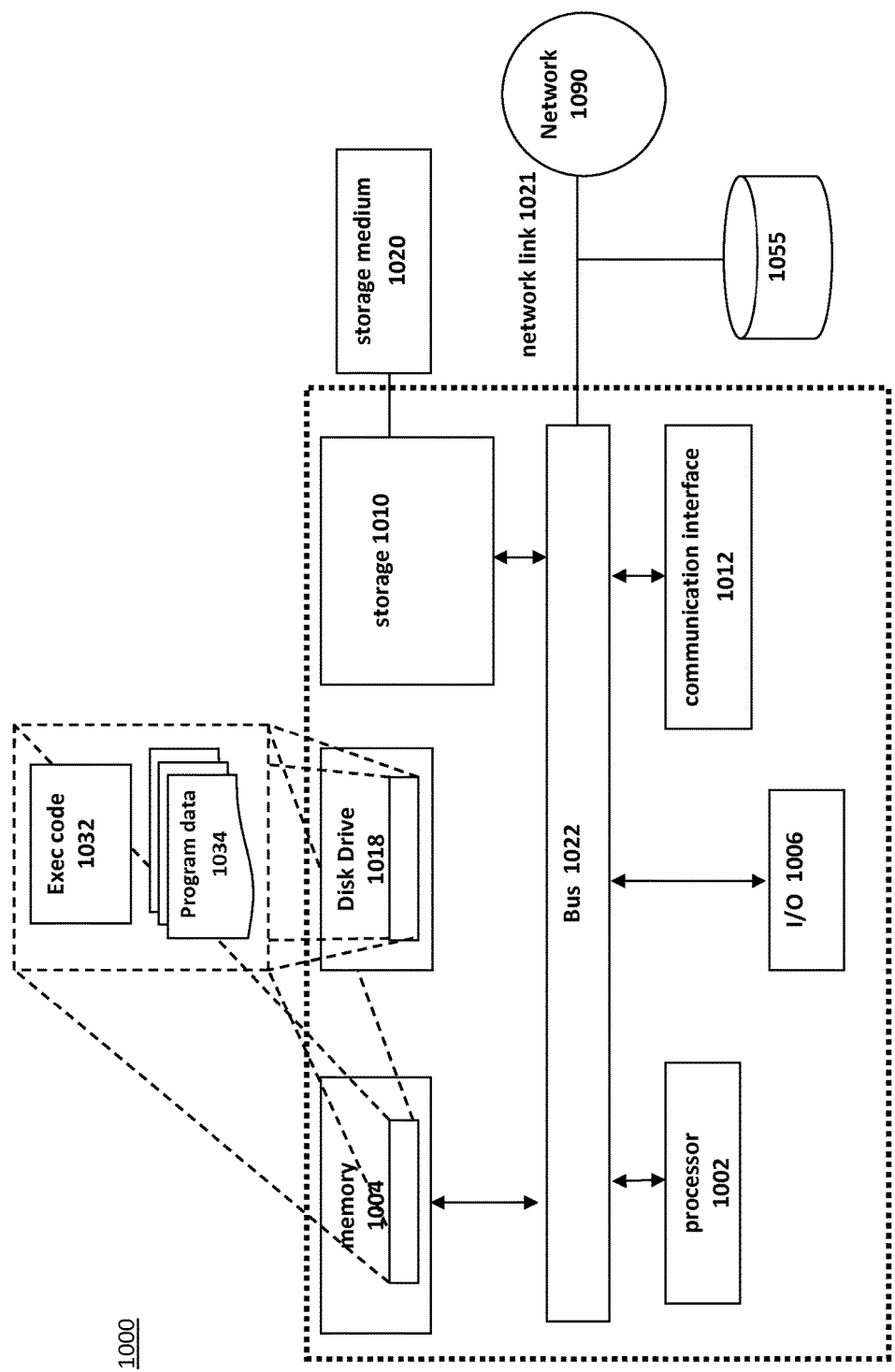
FIG. 10 is a high level block diagram showing an information processing system configured to operate according to an embodiment of the present invention.

Referring now in specific detail to the FIG. 10, there is provided a simplified high-level block diagram of an information processing system 1000 for real-time feedback collection in which the present invention may be implemented. For purposes of this invention, computer system 1000 may represent any type of computer, information processing system or other programmable electronic device, including a client computer, a server computer, a portable computer, an embedded controller, a personal digital assistant, and so on. The computer system 1000 may be a stand-alone device or networked into a larger system. Computer system 1000, illustrated for exemplary purposes as a networked computing device, is in communication with other networked computing devices (not shown) via network 1090. As will be appreciated by those of ordinary skill in the art, network 1090 may be embodied using conventional networking technologies and may include one or more of the following: local area networks, wide area networks, intranets, public Internet and the like.

In general, the routines which are executed when implementing these embodiments, whether implemented as part of an operating system or a specific application, component, program, object, module or sequence of instructions, will be referred to herein as computer programs, or simply programs. The computer programs typically comprise one or more instructions that are resident at various times in various memory and storage devices in an information processing or handling system such as a computer, and that, when read and executed by one or more processors, cause that system to perform the steps necessary to execute steps or elements embodying the various aspects of the invention.

Throughout the description herein, an embodiment of the invention is illustrated with aspects of the invention embodied solely on computer system 1000, for simplicity. As will be appreciated by those of ordinary skill in the art, aspects of the invention may be distributed among one or more networked computing devices which interact with computer system 1000 via one or more data networks such as, for example, network 1090. However, for ease of understanding, aspects of the invention have been described as embodied in a single computing device—computer system 1000.

Computer system 1000 includes processing device 1002 which communicates with an input/output subsystem 1006, memory 1004, storage 1010 and network 1090. The processor device 1002 is operably coupled with a communication infrastructure 1022 (e.g., a communications bus, cross-over bar, or network). The processor device 1002 may be a general or special purpose microprocessor operating under control of computer program instructions 1032 executed from memory 1004 on program data 1034. The processor 1002 may include a number of special purpose sub-processors such as a comparator engine, each sub-processor for executing particular portions of the computer program instructions. Each sub-processor may be a separate circuit able to operate substantially in parallel with the other sub-processors.

Some or all of the sub-processors may be implemented as computer program processes (software) tangibly stored in a memory that perform their respective functions when executed. These may share an instruction processor, such as a general purpose integrated circuit microprocessor, or each sub-processor may have its own processor for executing instructions. Alternatively, some or all of the sub-processors may be implemented in an ASIC. RAM may be embodied in one or more memory chips.

The memory 1004 may be partitioned or otherwise mapped to reflect the boundaries of the various memory subcomponents. Memory 1004 may include both volatile and persistent memory for the storage of: operational instructions 1032 for execution by processor device 1002, data registers, application storage and the like. Memory 1004 preferably includes a combination of random access memory (RAM), read only memory (ROM) and persistent memory such as that provided by a hard disk drive 1018. The computer instructions/applications that are stored in memory 1004 are executed by processor 1002. The computer instructions/applications 1032 and program data 1034 can also be stored in hard disk drive 1018 for execution by processor device 1002. Database 1055 pictured here is a representation of storage for the feedback data, producer data, and consumer data and may be a plurality of databases operably coupled with a server network 1090 such as the Internet through network link 1021.

Those skilled in the art will appreciate that the functionality implemented within the blocks illustrated in the diagram may be implemented as separate components or the functionality of several or all of the blocks may be implemented within a single component. The I/O subsystem 1006 may comprise various end user interfaces such as a display, a keyboard, and a mouse. The I/O subsystem 1006 may further comprise a connection to a network 1090 such as a local-area network (LAN) or wide-area network (WAN) such as the Internet.

The computer system 1000 may also include storage 1010, representing a magnetic tape drive, an optical disk drive, a CD-ROM drive, and the like. The storage drive 1010, which can be removable, reads from and/or writes to a removable storage unit 1020 in a manner well known to those having ordinary skill in the art. Removable storage unit 1020, represents a floppy disk, a compact disc, magnetic tape, optical disk, CD-ROM, DVD-ROM, etc. which is read by and written to by removable storage drive 1010. As will be appreciated, the removable storage unit 1020 includes a non-transitory computer readable medium having stored therein computer software and/or data for implementing the real-time feedback collection system.

The computer system 1000 may also include a communications interface 1012. Communications interface 1012 allows software and data to be transferred between the computer system and external devices. Examples of communications interface 1012 may include a modem, a network interface (such as an Ethernet card), a communications port, a PCMCIA slot and card, etc. Software and data transferred via communications interface 1012 are in the form of signals which may be, for example, electronic, electromagnetic, optical, or other signals capable of being received by communications interface 1012.

Therefore, while there has been described what is presently considered to be the preferred embodiment, it will be understood by those skilled in the art that other modifications can be made within the spirit of the invention. The above description(s) of embodiment(s) is not intended to be exhaustive or limiting in scope. The embodiment(s), as described, were chosen in order to explain the principles of the invention, show its practical application, and enable those with ordinary skill in the art to understand how to make and use the invention. It should be understood that the invention is not limited to the embodiment(s) described above, but rather should be interpreted within the full meaning and scope of the appended claims.

We claim:

1. A method comprising:
   using a processor device, performing acts of:
   generating a unique product code identifying a product based upon a combination of an existing product bar code of the product and at least one of a URL to an on-line survey site associated with the product or an account identifier (ID) of a producer of the product, the unique product code different than the existing product bar code;
   interacting with a printing system to print the unique product code for attachment to the product;
   receiving data from a device of a scan, by a camera of the device, of the unique product code;
   decoding the data to reveal a URL of an on-line survey site associated with the product;
   verifying that the scan is not associated with an attempt to commit feedback fraud by:
   determining a first geo-location of the device and a second geo-location of the product;
   comparing the first geo-location to a threshold distance of the second geo-location; and
   determining whether the first geo-location is within the threshold distance of the second geo-location;
   responsive to verifying that the scan is not associated with an attempt to commit feedback fraud based upon determining that the first geo-location is within the threshold distance of the second geo-location:
   using push technology to serve the on-line survey site to the device based upon the URL;
   dynamically generating, based upon one or more interface customization selections and product specific information about the product retrieved from a product database comprising product specific information about a plurality of products, a customized interface within the on-line survey site;
   receiving from the on-line survey site, through the customized interface, feedback about the product; and
   storing the feedback in a feedback log database comprising a plurality of feedback data sets associated with one or more devices;
   generating a real-time analysis report comprising trending data indicative of popularity of the product based upon the plurality of feedback data sets associated with the one or more devices including the feedback received in association with the device; and
   controlling a graphical user interface to display the real-time analysis report to the producer of the product.

2. The method of claim 1 wherein generating a unique product code comprises combining the existing product bar code, the account ID and the URL.

3. The method of claim 1 further comprising:
   receiving a feedback preference from the producer; and
   generating the on-line survey site according to the feedback preference.

4. The method of claim 3 wherein receiving the feedback preference comprises receiving at least one of a numerical rating or comments.

5. The method of claim 1 further comprising:
   analyzing the feedback to provide at least one of product information or consumer demographic information.

6. The method of claim 1 wherein generating a unique product code comprises combining the existing product bar code and the URL.

7. The method of claim 1 further comprising:
   placing a share feature on the on-line survey site; and
   sending the feedback to members of a social network responsive to a selection of the share feature.

8. The method of claim 1 further comprising:
   receiving multimedia data about the product; and
   providing the multimedia data on the on-line survey site.

9. The method of claim 1 wherein generating a unique product code comprises combining the account ID and a unique sequence number.

10. The method of claim 1 further comprising at least one of:
    restricting a number of times a consumer can provide feedback about the product; or
    setting an expiration date on the unique product code.

11. An information processing system comprising:
    a memory with computer-executable instructions that, when executed, cause a computer to perform:
    receiving data from a device of a scan, by the device, of a unique product code identifying a product, the unique product code, when decoded, revealing an address of an on-line survey site associated with the product, the unique product code based upon a combination of an existing product bar code of the product and at least one of the address of the on-line survey site or an account identifier (ID) of a producer of the product, the unique product code different than the existing product bar code;
    verifying that the scan is not associated with an attempt to commit feedback fraud by:
    determining a first geo-location of the device and a second geo-location of the product;

comparing the first geo-location to a threshold distance of the second geo-location; and
determining whether the first geo-location is within the threshold distance of the second geo-location;
responsive to verifying that the scan is not associated with an attempt to commit feedback fraud, using push technology to serve the on-line survey site to the device based upon the address;
dynamically generating, using a processor device and based upon one or more interface customization selections and product specific information about the product retrieved from a product database comprising product specific information about a plurality of products, a customized interface within the on-line survey site;
receiving from the on-line survey site, through the customized interface, feedback about the product;
storing the feedback in a feedback log database comprising a plurality of feedback data sets associated with one or more devices;
generating a real-time analysis report based upon the plurality of feedback data sets associated with the one or more devices including the feedback received in association with the device; and
controlling a graphical user interface to display the real-time analysis report to the producer of the product.

12. The information processing system of claim 11 wherein the verifying is further performed based upon an expiration date associated with the unique product code.

13. The information processing system of claim 11 wherein the memory further comprises computer-executable instructions that, when executed, cause the computer to perform:
analyzing the feedback to provide at least one of product information or consumer demographic information.

14. The information processing system of claim 11 wherein the memory further comprises computer-executable instructions that, when executed, cause the computer to perform:
sending the feedback to members of a social network.

15. The information processing system of claim 11 wherein the unique product code is based upon a combination of the existing product bar code and the address.

16. A computer program product comprising a non-transitory computer-readable storage medium comprising computer-executable instructions that, when executed, enable a computer to:
generate a unique product code identifying a product based upon a combination of an existing product bar code of the product and a URL to an on-line survey site associated with the product, the unique product code different than the existing product bar code;
interact with a printing system to print the unique product code for attachment to the product;
receive a request associated with the unique product code from a device;
verify that the request is not associated with an attempt to commit feedback fraud by:
determining a first geo-location of the device and a second geo-location of the product;
comparing the first geo-location to a threshold distance of the second geo-location; and
determining whether the first geo-location is within the first threshold distance of the second geo-location; and
responsive to verifying that the request is not associated with an attempt to commit feedback fraud based upon determining, using a processor device, that the first geo-location is within the threshold distance of the second geo-location:
using push technology to provide the on-line survey site to the device; and
provide an interface within the on-line survey site for providing feedback about the product, the interface generated based upon product specific information about the product retrieved from a product database comprising product specific information about a plurality of products.

17. The computer program product of claim 16 wherein the non-transitory computer-readable storage medium further comprises computer-executable instructions that, when executed, enable the computer to:
receive from the on-line survey site feedback about the product.

18. The computer program product of claim 17 wherein the non-transitory computer-readable storage medium further comprises computer-executable instructions that, when executed, enable the computer to:
dynamically generate the interface based upon one or more interface customization selections.

19. The computer program product of claim 17 wherein the device comprises a mobile device.

20. The computer program product of claim 17 wherein the non-transitory computer-readable storage medium further comprises computer-executable instructions that, when executed, enable the computer to:
responsive to determining that the first geo-location is not within the threshold distance of the second geo-location, not provide the on-line survey site to the device.

* * * * *